United States Patent [19]
Bishop

[11] Patent Number: 5,435,458
[45] Date of Patent: Jul. 25, 1995

[54] CHEMICAL SPILL CONTAINMENT APPARATUS

[75] Inventor: Merrill E. Bishop, Crystal Lake, Ill.

[73] Assignee: Safety-Kleen Corp., Elgin, Ill.

[21] Appl. No.: 947,310

[22] Filed: Sep. 18, 1992

[51] Int. Cl.⁶ ............................................. B65D 39/00
[52] U.S. Cl. ................................... 220/573; 184/106;
137/312
[58] Field of Search ................. 220/571, 573; 184/1.5,
184/106; 141/267, 391; 137/312

[56] References Cited

U.S. PATENT DOCUMENTS

| | | | |
|---|---|---|---|
| 4,114,660 | 9/1978 | Arruda | 184/106 X |
| 4,139,029 | 2/1979 | Geraci | 141/391 X |
| 4,651,887 | 3/1987 | Patrick | 220/1 C |
| 4,936,418 | 6/1990 | Clausen | 184/106 |
| 5,052,422 | 10/1991 | Franz et al. | 134/104.2 |
| 5,062,500 | 11/1991 | Miller et al. | 220/573 X |
| 5,099,872 | 3/1992 | Tarvin et al. | 137/312 |
| 5,143,178 | 9/1992 | Latham, Jr. | 184/1.5 X |

OTHER PUBLICATIONS

"Tank Car Network Serves Safety-Kleen on Both Sides of the Border", Trans/Action, A Published Quarterly of Union Tank Car Company, Winter 1992, pp. 6–9.

Primary Examiner—Steven M. Pollard
Attorney, Agent, or Firm—James T. FitzGibbon

[57] ABSTRACT

New and improved spill containment devices and methods, for use primarily by the railroads, are provided in one or more lidded catch pans positionable generally around and under a transportation container for collecting and containing spilled or dripping chemical materials. A preferred spill containment apparatus comprises a combination of three catch pans positionable along a railroad siding including an inboard pan disposed between the rails and two outboard pans extending outwardly adjacent and alongside the rails and the inboard pan. The outboard pans have sectional lids that swing back over the railroad rails. This not only protects the area from splashing caused by heavy dropping in the big center pan, but also ensures that drips from above do not land on the rails or the gap between the inboard pan and the rails. When not in use, these sloped sectional lids divert dirt and rainwater away from the outboard receptacle or collecting basin portions of each outer pan. The inboard pan is designed to cover the space between the rails and still allow space for the flange of the railroad car or locomotive wheel to pass around the pan. The lid of this pan is designed to slope so rainwater will run off the lid. The lid is made in two sections. Each section is on a confined roller track that parallels the railroad rails. For normal use, these lids are rolled apart exposing whatever space is deemed to be needed to catch any overflow or inadvertent release.

7 Claims, 7 Drawing Sheets

CHEMICAL SPILL CONTAINMENT APPARATUS

BACKGROUND OF THE INVENTION

The present invention generally relates to spill containment apparatus and methods for preventing undesirable discharge of chemical materials onto the ground. More particularly, it relates to new and improved spill containment devices and methods for use primarily by the railroads including one or more lidded catch pans positionable generally around and under a transportation container for collecting and containing spilled or dripping chemical materials.

With increased public and governmental awareness of groundwater contamination caused by various industries including the petro-chemical industry, companies are reviewing their chemical transfer operations to minimize their legal and environmental exposure. Traditionally, railroad tank car unloading has been relatively unregulated and most railroad track sidings reflect that level of unconcern with "minor" discharges of whatever was being loaded or unloaded. Often the commodity being shipped was inexpensive per gallon or perceived to be of little economic impact to the company, and therefore, any spills were either hosed down or just left for the next rain to clear away. With the advent of stiff fines and high soil remediation costs, the idea of spill containment pans under the tank car becomes the prophetic ounce of prevention that eliminates a pound of cure.

As petro-chemical technology develops more exotic compounds, the cost per gallon has increased. The increase in road trucking costs and the adoption of hazardous materials shipping regulations and restricted truck routes have made many shippers reconsider using railroad tank cars and drums in railroad box cars. Since spills most often occur during the loading and unloading operation, well-designed, clean spill containment pans can recapture these valuable commodities. Often, if these pans do not contain dirt and rainwater, the material accidentally discharged and recaptured in the containment pan can be collected and economically reused.

Currently, many chemical companies use spill pans that actually are only diversion aprons that require construction of some type of collection sump. These sumps are subject to crack failure or filling with dirt and water. Since collection pans are subject to rainwater, snow and blowing dirt and debris, their effectiveness as spill containment is questionable. Environmental regulations state that any rainwater collected in these chemical spill containment pans is considered contaminated and must be handled with the same concern and "cost" as hazardous waste.

Prior art efforts to provide spill containment for leaking, dripping and spilled materials particularly oily materials have included providing a flexible plastic drop cloth or sheet which forms a barrier to prevent contact of the chemical material with the ground. The plastic sheet is either suspended or mounted to the underside of a transport vehicle, as in U.S. Pat. No. 4,936,418 for example, or it is provided with inflatable or raised edge structures to funnel fluids to a sump or collecting area as is described in U.S. Pat. No. 5,099,872. The barrier sheet type containment arrangements generally do not include any means for preventing unwanted ingress of rain, sleet, snow, dirt, dust and other environmental contaminants.

Catch pans with convertible lidded structures are known in the art as taught in U.S. Pat. Nos. 5,052,422 and 4,651,887. The latter patent is designed for use between the rails of a railroad siding. The spill pan described in the '887 patent is generally effective for containing spills and drips falling directly downward between the rails. The pan has a generally transverse orientation between the rails which requires direct overhead placement of the rail car and its openings in order to be in proper position for use. Moreover, the containment apparatus defined in the '887 patent does not provide any means for catching and collecting outboard spills occurring alongside the rails instead of between them.

In order to overcome the deficiencies of the prior art devices and methods, it is an object of the present invention to provide a new and improved spill containment apparatus for use with railroad equipment extending parallel to a railroad siding so that careful placement of the rail car over a precise location is not required.

It is another object of the present invention to provide a spill containment apparatus for beside the rails use, as well as for between the rails use to provide more effective environmental spill protection for loading and unloading operations for the railroads.

It is a further object of the present invention to provide a new and improved spill containment apparatus including a movable lid structure to prevent undesired ingress of environmental contaminants when not in use and which opens outwardly to effectively enlarge the surface area of ground protected from spill contamination.

SUMMARY OF THE INVENTION

In accordance with these and other objects, the present invention provides a new and improved spill containment system and apparatus which preferably comprises a combination of three catch pans positionable along a railroad siding including an inboard pan disposed between the rails and two outboard pans extending outwardly adjacent and alongside the rails and the inboard pan.

In accordance with the invention, three metal spill pans approximately 19 feet long and only as deep as the "top of rail," or approximately 5 to 6 inches are provided. Two identical hinged lid pans are positioned outboard of the railroad track rails and one larger inboard pan is positioned between the rails.

The center or inboard pan is wide enough to cover the area between the rails, yet still allows for ample railroad wheel flange clearance. This center pan has at least one and preferably two sliding lids that roll back on small rails paralleling the railroad tracks. This allows the operator to open or expose the spill pan in just the right location, regardless of where the railroad company "spots" the car or wherever the connections are located. Since the pan is covered at all times other than during the loading or unloading operation, very little dirt or rainwater will be collected. If it does need cleaning out, the lids can be rolled back to totally expose all corners. Four auxiliary NPT pipe connection couplings are supplied to allow for remote draining or sump pump systems.

The outboard pans have sectional lids that swing back over the railroad rails. This not only protects the area from splashing caused by heavy dropping in the big center pan, but also ensures that drips from above do not land on the rails or the gap between the inboard pan and the rails. When not in use, these sloped sectional lids divert dirt and rainwater away from the outboard receptacle or collecting basin portions of each outer pan. The outboard pans which are approximately 19 feet long and 2 feet wide, are preferably each equipped with two NPT coupling auxiliary drain openings for connection to a remote sump or drainage system.

The inboard pan is designed to cover the space between the rails and still allow space for the flange of the railroad car or locomotive wheel to pass around the pan. The lid of this pan is designed to slope so rainwater will run off the lid, yet this lid will not interfere with either locomotive or other railroad cars that pass over it. The lid is made in two sections. Each section is on a confined roller track that will move both ways paralleling the railroad tracks. In the full open position, the full interior of 19 feet by 4 feet is exposed to catch any overflows and provides easy access for cleaning or inspection. For normal use, these lids are rolled apart exposing whatever space is deemed to be needed to catch any overflow or inadvertent release. A hasp and lock can be added to secure the lids in a closed position.

The inboard pan is designed to lay directly on top of the railroad ties and all ballast should be removed that is higher than the ties. Small lobes (tabs) of steel are provided at each end of the pan bottom so once the pan and lid roller track is aligned with the rails, it can be nailed down to the railroad ties. This precludes later misalignment and possible equipment damage during railroad switching operations.

At each end of this inboard pan are two 4-inch NPT half couplings. If deemed necessary by the user, four drainage pipes can be connected to the pan. Piping can then be extended horizontally until it passes a railroad tie and then it can be routed under the rail with a series of elbows. This way, overflows of substantial rates per minute can be immediately diverted to either a high volume sump or to a pumping system. Connections to the containment pan can be monitored.

The outboard containment pans can be used in conjunction with the inboard pan or independently as when protection is needed during loading of box cars with drums or other smaller containers. The hinged lid of this 19 foot by 2 foot pan leans inward over the rail in the open position to shield the open space required for the rail and clearance for wheel passage. The sectioned lid allows for partial opening for normal use or for total opening for cleaning. Each end lid section is a separate removable panel to facilitate easy replacement. In the closed position, this lid slopes away from the rail to direct rainwater.

At each end of this outboard pan is a single, 4 inch NPT half coupling. As with the inboard pan, this allows the user to connect the outboard pan to a drainage system by piping it horizontally until it clears a railroad tie and then it can pass under the rails as needed to meet in a collection sump. Also, at each end of this pan, small lobes (tabs) of steel attached to the bottom of the pan are provided so that once the pan is aligned with the track, it too can be nailed down to a tie.

Both the inboard and two outboard containment pans are made of sheet steel and normally will be hot dip galvanized. In accordance with the teachings of this invention, pans for special applications may be provided. The pans may be epoxy painted or constructed of other materials like aluminum, stainless steel, polyethylene or polypropylene.

Other objects and advantages of the present invention will become apparent from the following Detailed Description of the Invention taken in conjunction with the Drawings in which:

DETAILED DESCRIPTION OF THE PREFERRED EMBODIMENTS

Figure 1:
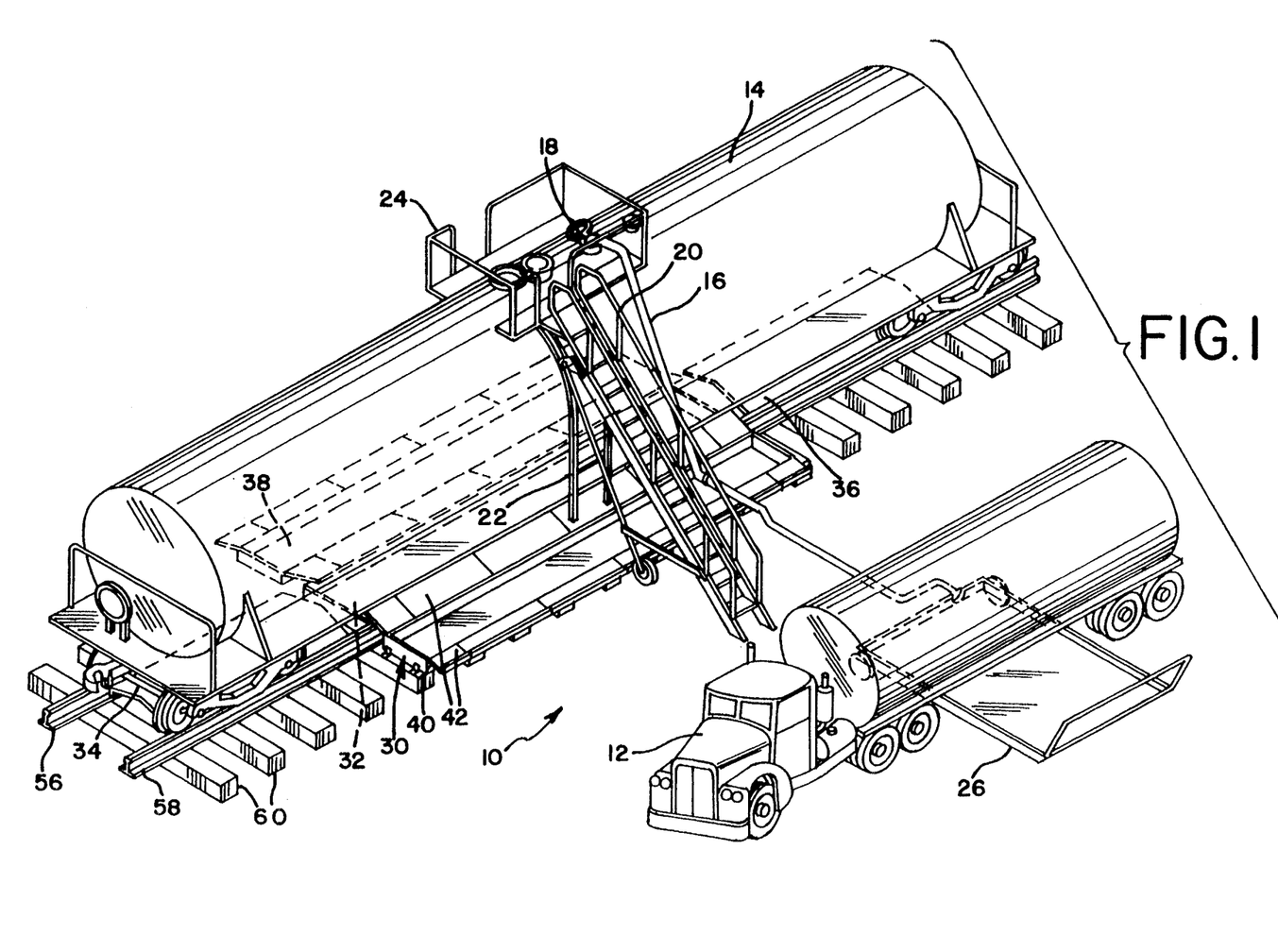
FIG. 1 is a perspective view of railroad tank car loading station and showing the new and improved chemical spill containment apparatus of the present invention shown in an open condition.

Referring now to FIG. 1, a preferred context of use for the present apparatus is illustrated in a chemical transfer station 10. At station 10, chemical materials, such as used motor oil, are transferred from a tanker truck 12 to a railroad tank car 14. Railroad tank car 14 is transferred when full or periodically to a re-refining plant operation (not shown) at another location accessible by rail where used motor oil is de-contaminated and re-refined into useful recycled products and materials such as clean lubrication oils. The tank truck 12 may make rounds of customer establishments pooling their used oil materials. The used oil is transferred by a pump and hose transfer apparatus 16 into a top access opening 18 provided in the top surface of the railroad tank car 14. Movable ladder assemblies such as ladder rig 20 or permanent access stairways or ladders 22 may also be provided or built onto the railroad tank car superstructure 24. As depicted in FIG. 1, a responsible modern chemical transfer station 10 includes spill containment apparatus at each location where unintentional drips, spills, misconnections or other accidents may occur, including a movable spill containment wagon 26 under the truck side of the transfer station 10 and the new and improved spill containment apparatus of the present invention, generally referred to by reference numeral 30, under the railroad side of the transfer station 10.

Referring now to FIGS. 2–7, spill containment apparatus 30, in accordance with the preferred embodiment, comprises a center spill or catch basin 32 having a pair of longitudinally retractable, reciprocatably slidable roof or cover members 34 and 36 and a pair of outboard spill containment pans 38 and 40 each having an upper spill control subassembly 42. Each upper spill control assembly 42 includes a first wider panel 44 hingedly, pivotably mounted to an inner beside-the-rail sidewall 46 and a second panel 48 hingedly mounted to the outwardly facing sidewall 50. First and second panels 44 and 48 are preferably subdivided as at 52 into smaller pairs of panel segments so that portions of the top opening 54 of the outer catch pan 38 or 40 may remain closed to limit the ingress of environmental contaminants when the entire length, 1, of top opening 54 is not required to be open to safely contain a potential spill.

In accordance with the preferred embodiment depicted therein, FIGS. 1–7 show that in their closed position, center pan 32 and outboard pans 38 and 40, do not interfere with normal railroad operation by selecting a pan height dimension, h, which is less than or equal to the height of the railroad rails 56 and 58. In accordance with the invention, when containment pans 32, 38 and 40 are in their open condition, the ground space between the rails 56 and 58 is covered by center pan 32 and the ground space from the center pan to a position spaced laterally outwardly from rails 56 and 58 is covered by the flared, funnel-like expanded opening of panels 44 and 48, to provide generally effective, continuous spill protection for the entire area under and around the tank car 14.

The outer end portions 62 of each panel 44 and 48 are designed for easy slide off removal to make repair or replacement easier in the event that railroad car 14 is inadvertently moved with the spill control subassembly 42 still in its open condition.

Figure 6:
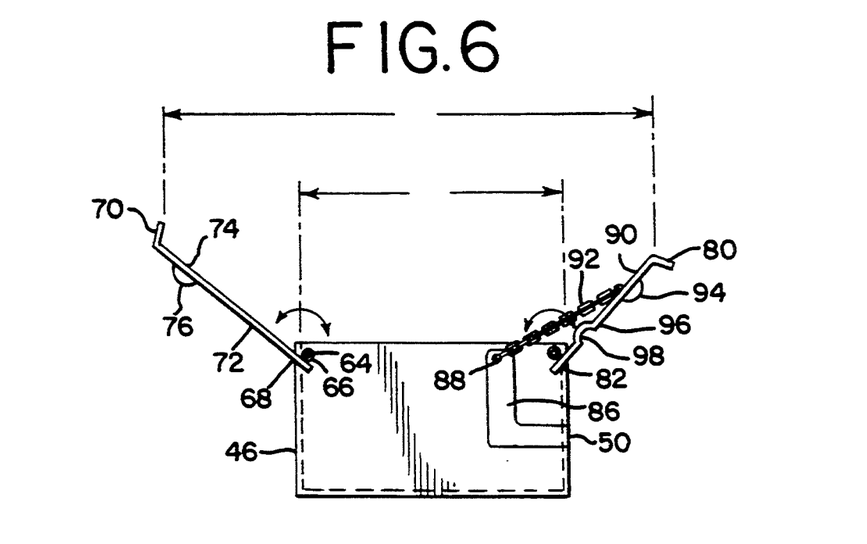
FIG. 6 is a fragmentary elevated cross-sectional view of the spill control panels shown in their raised and open position.
Figure 7:
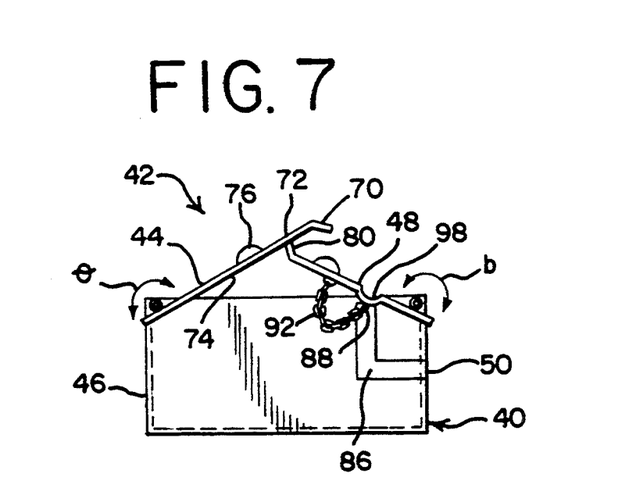
FIG. 7 is a fragmentary elevated cross-sectional view of the spill control panels shown in their lowered, closed position.
Figure 8:
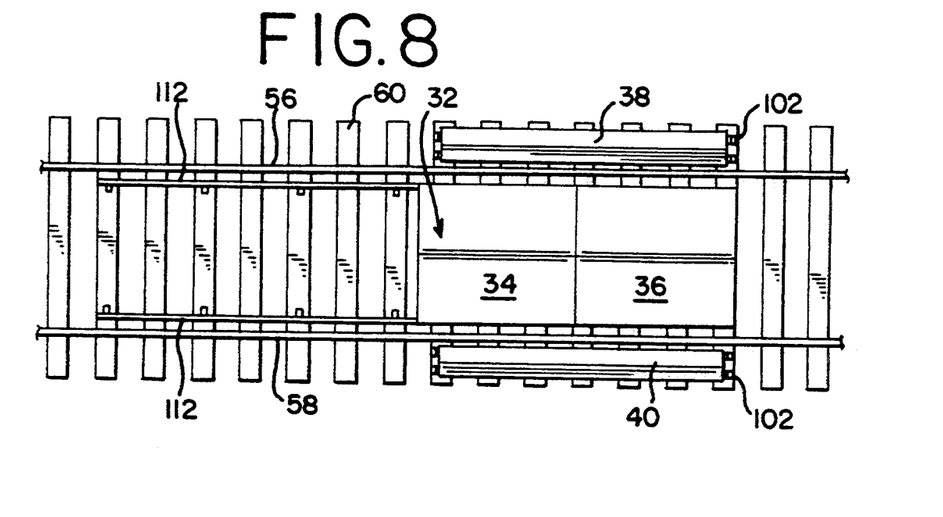
FIG. 8 is a top plan view of the spill containment apparatus of the invention shown in the closed position.
Figure 9:
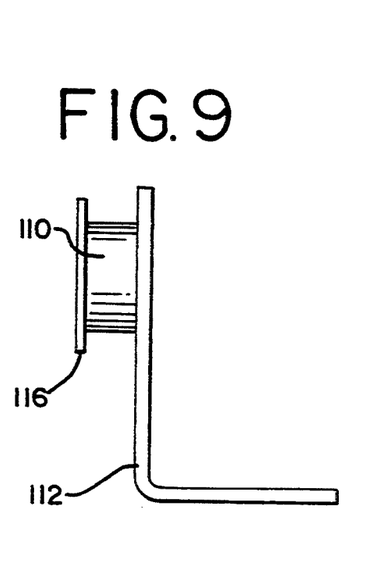
FIG. 9 is an elevated side view of the center pan cover slide bracket in accordance with the invention.

Referring now in greater detail to FIGS. 6 and 7, each outboard pan 38 or 40 is provided with a spill control subassembly 42. Each spill control subassembly 42 has a first wider panel 44 hingedly pivotably mounted by ears 64 to a hinge rod 66 extending adjacent pan sidewall 46. The upper end of sidewall 46 is relieved to permit unobstructed rotation of the first fixed or pivot end 68 of panel 44. Panel 44 has a curved free end 70 opposite the fixed end 68 and includes a public lid surface 72 on one side and a chemical directing surface 74 on the opposite side. A handle 76 is provided to facilitate movement of panel 44 between its open and closed positions shown in FIGS. 6 and 7, respectively. In its fully opened condition, panel 44 reaches a stop in its rotation when its public surface 72 comes to rest against the top of the rail 58. Inward rotation of panel 44 stops when the chemical collecting surface abuts against the curving free end 80 on second panel 48. Second panel 48 also has a fixed end 82 which is also rotatably mounted on a hinge rod or pivot axis 84 adjacent to sidewall 50. Sidewall 50 also is relieved to provide clearance for rotation of the fixed end 82. At least two upwardly projecting L-shaped mounting brackets 86 are mounted to sidewall 50 to hold a longitudinally extending bearing rod 88 mounted to an upper end of brackets 86. Bearing rod 88 provides an inward stop abutment to positively position panel 48 in its inward closed position shown in FIG. 7, so that inwardly directed gusset 98 in spill containment surface 90 of panel 48 bears against bearing rod 88 as shown. A chain length restraint 92 may be affixed to the mounting bracket 86 or bearing rod 88 and to the surface 90 to provide a positive rotation stop in the opposing outward direction, until panel 48 reaches its open collecting position as shown in FIG. 6. A handle 94 may also be provided on the public rain deflection surface 96 side of panel 48.

Figure 2:
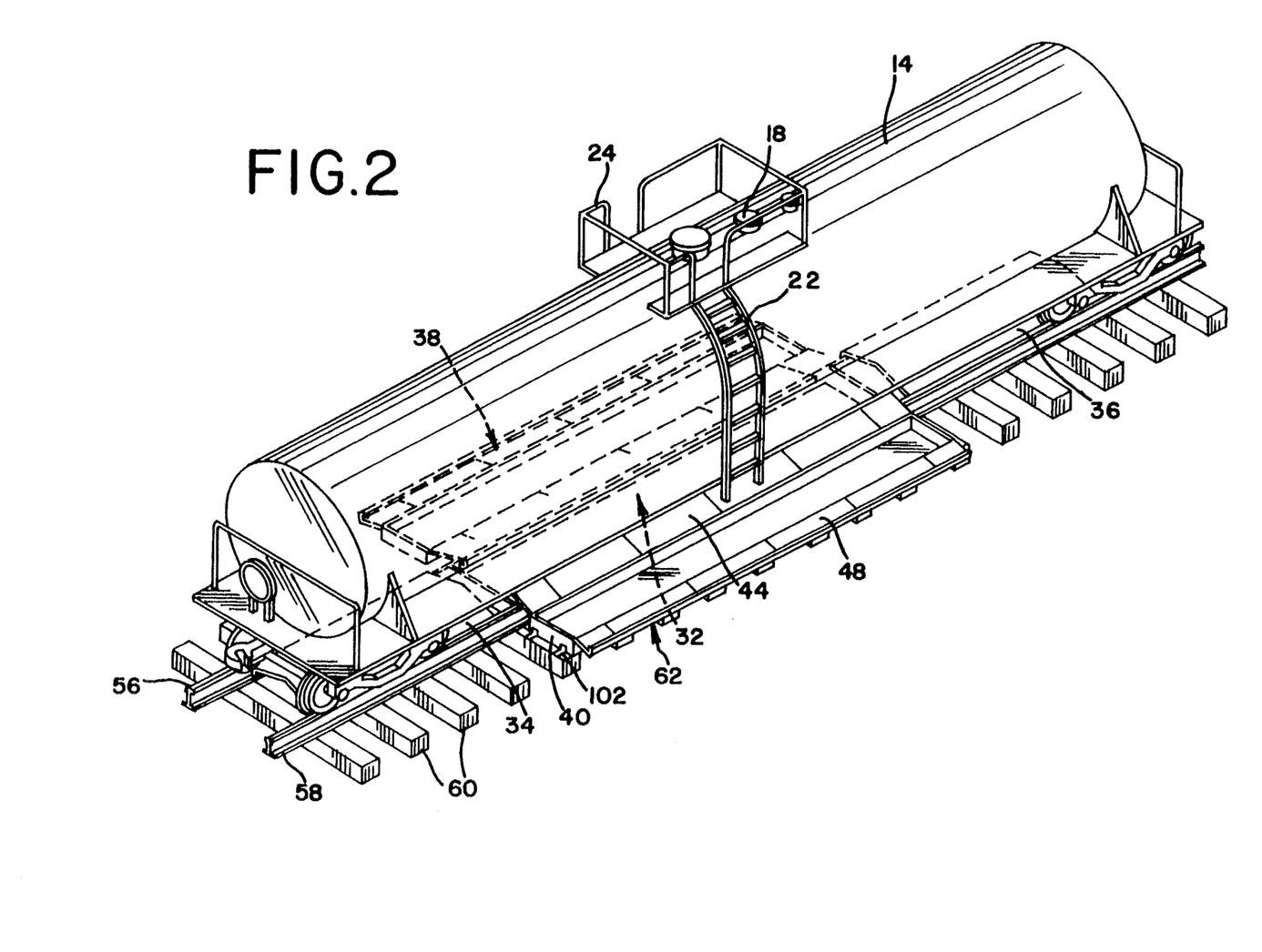
FIG. 2 is another perspective view of the railroad tank car loading station, similar to FIG. 1, with the truck and loading arm removed for clarity to show the new and improved spill containment apparatus in the open collecting position of use.
Figure 3:
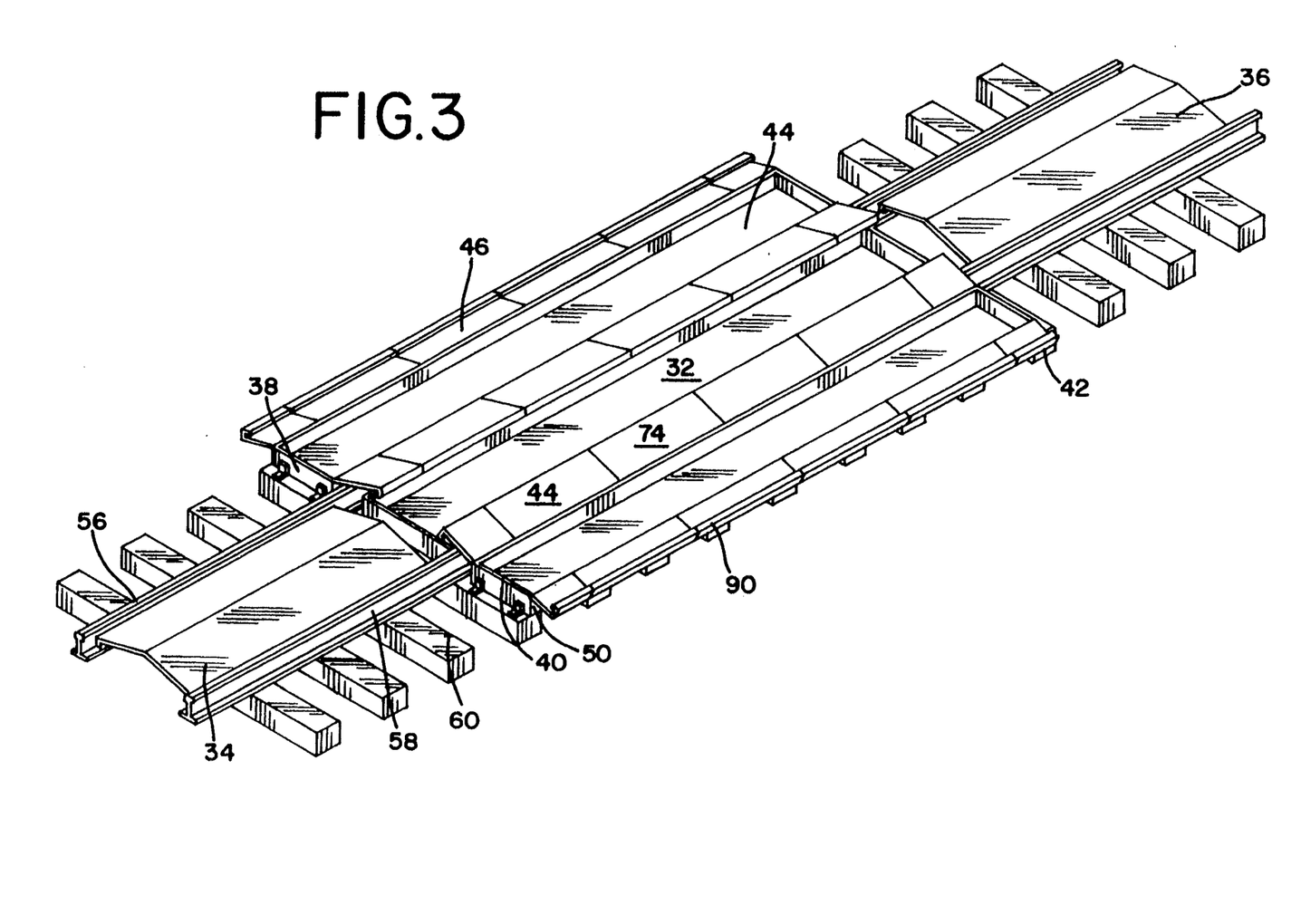
FIG. 3 is still another perspective view of the new and improved spill containment apparatus of the present invention shown in the open condition of use with the railroad car removed for clarity.
Figure 4:
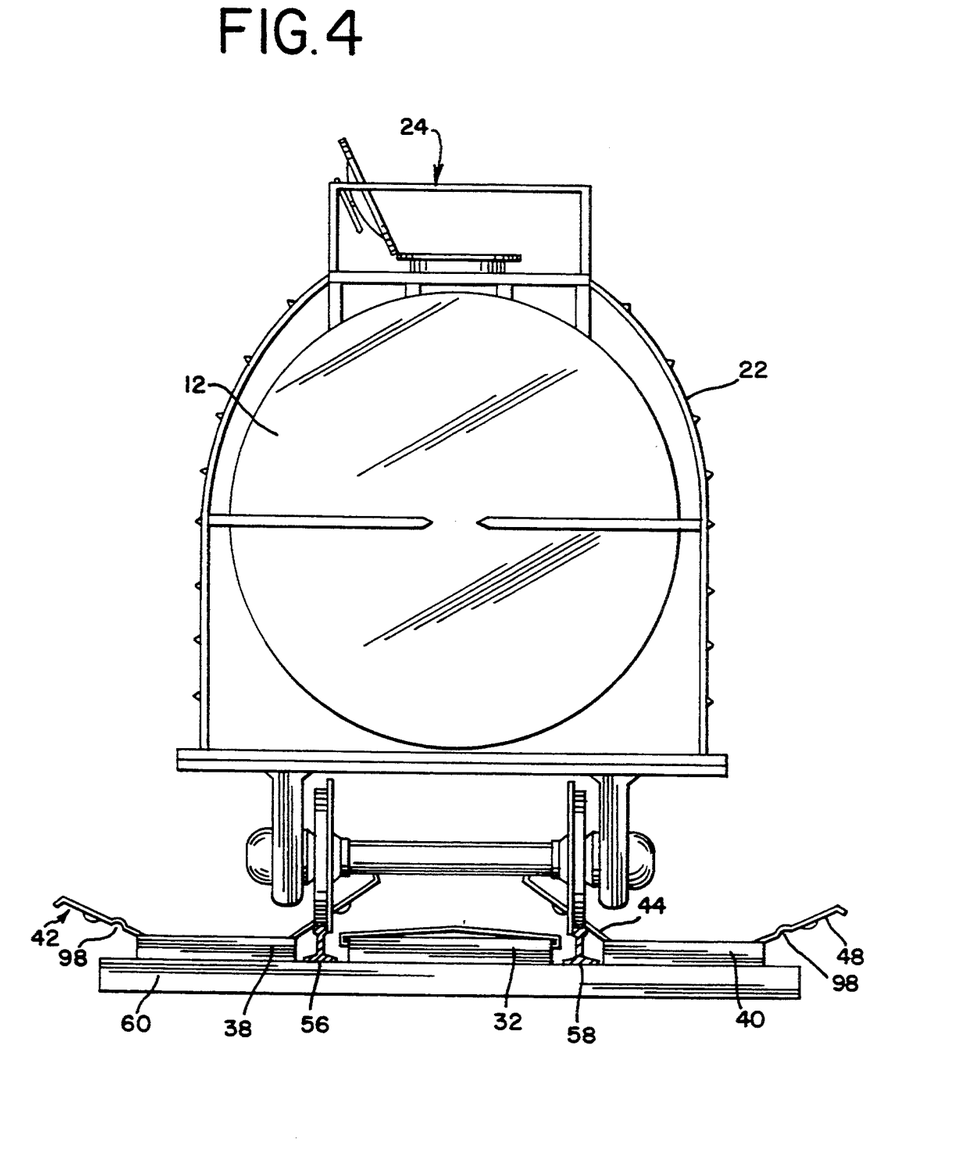
FIG. 4 is an elevated cross-sectional view of the new and improved spill containment apparatus shown in its open condition taken along view lines 4—4 in FIG. 2.
Figure 5:
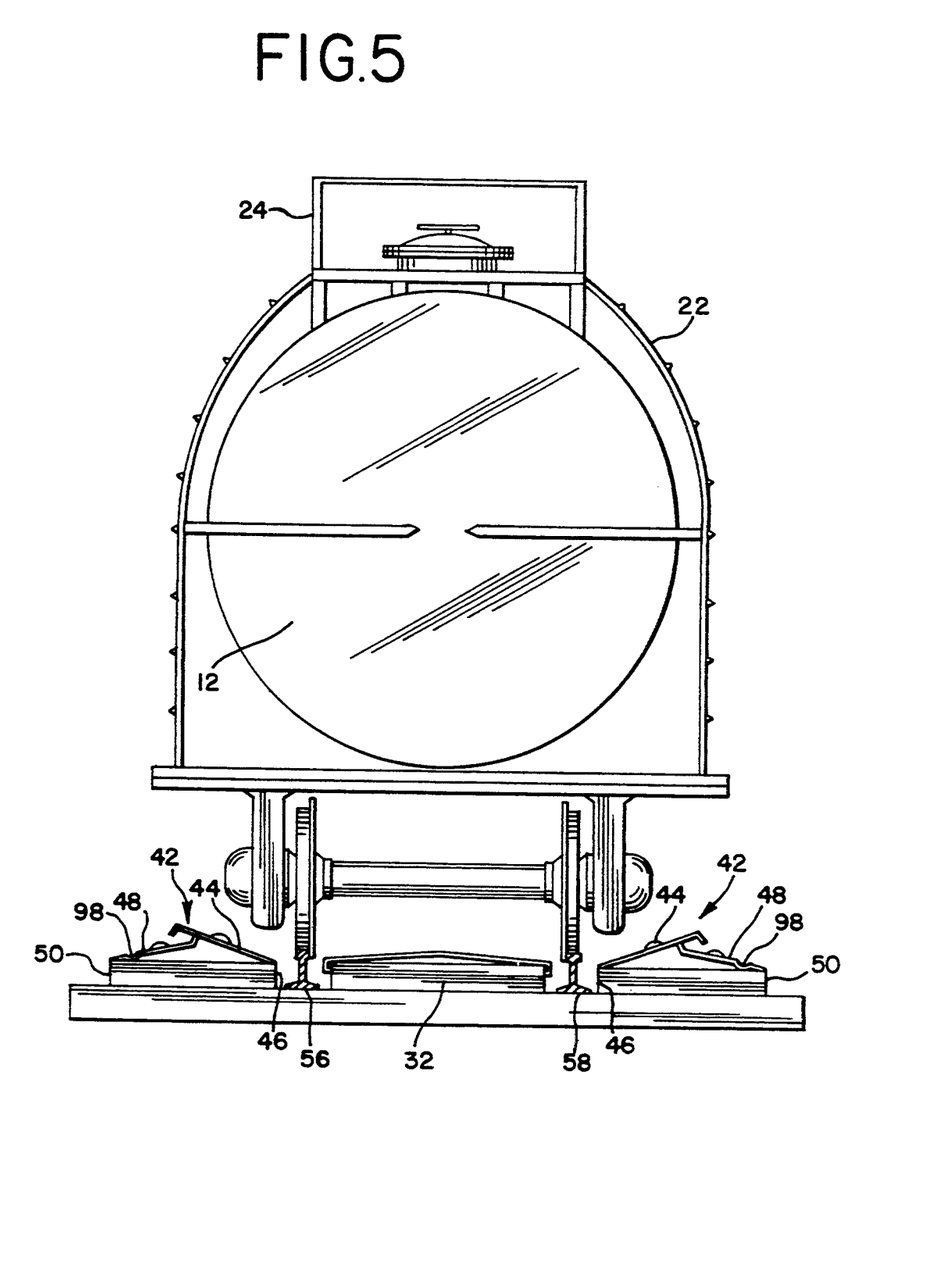
FIG. 5 is an elevated cross-sectional view of the new and improved spill containment apparatus of the invention similar to FIG. 4, but showing the spill control panels in their closed position of use.
Figure 11:
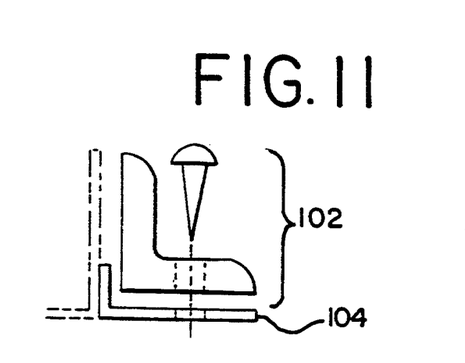
FIG. 11 is an elevated side view of the pan hold-down positioning bracket in accordance with the present invention.

In the closed position of the spill control assembly 42, panels 44 and 48 are canted at an upward angle like a peaked roof causing environmental moisture and contaminants to run off their respective deflector surfaces 72 and 96 away from the interior reservoir area 98. In the open position however, as shown in FIG. 6, the spill contact surfaces 74 and 90 are facing upwardly and outwardly which greatly expands the effective spill containment coverage area for pans 38 and 40. Outboard pans 38 and 40 may be fixed in position on the railroad ties 60 adjacent rails 56 and 58 such as by means of L-brackets and mounting stakes 102 passed through loop formations 104 on the pan ends, as shown in FIGS. 2 and 11.

Figure 10:
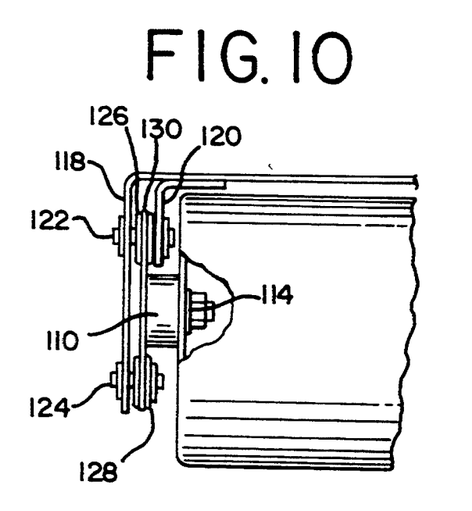
FIG. 10 is an elevated fragmentary side view, partly in section showing the center pan sliding cover and slide rail extension in accordance with the invention.

Referring now to FIGS. 2–3, 5 and 8–10, the center pan 32 includes at least one peaked roof or cover portion 34 or 36 or preferably both, which is reciprocally movable along an axis parallel to the rails 56 and 58. Cover members 34 or 36 slide along a pair of spaced apart guide rails 110 defined by L-shaped mounting brackets 112 (FIG. 9) and pan-mounted side mounting brackets 114 (FIG. 10). The continuous guide rail 110 is formed by the T-rail projections 116 on brackets 112 and 114. The side edge portions of covers 34 and 36 are provided with a pair of depending peripheral flange portions 118 and 120 which serve as mounting brackets for receiving a pair of rods or axles 122 and 124 each rotatably receiving a grooved roller wheel 126 and 128 as shown in FIG. 10. The cover members 36 and 38 are slid onto guide rails 110 so that the T-rail projections 116 are disposed within the center groove 130 of each roller wheel 126 and 128. In this manner, the covers 36 and 38 may be rolled forward or back over the center collecting pan 32 to open the elongate central catch pan 32 at any desired point.

Although the present invention has been described with reference to certain preferred embodiments, modifications or changes may be made therein by those skilled in this art without departing from the scope or spirit of this invention as defined by the appended claims.

What is claimed is:

1. A chemical spill containment apparatus positionable alongside a railroad transportation shipping container having an access opening defined in a sidewall surface thereof through which shipped chemical materials are loaded and unloaded, said containment apparatus being positionable adjacent an underside surface of said shipping container generally below said access opening and extending generally parallel to and outwardly adjacent at least one rail of a pair of rails upon which said railroad shipping container rests, said spill containment apparatus comprising at least one catch pan including a base and an upstanding peripheral sidewall defining a chemical-receiving reservoir area having a top opening with an associated cross-sectional area, and a multi-purpose flow control assembly adapted in a first position of use to serve as a cover for protecting said reservoir area against entry of environmental contaminants, and in a second position of use to serve as a funnelling collector for effectively enlarging the cross-sectional area of said top opening and for directing falling chemical materials impinging thereon and falling over and outside of the rails into the reservoir area of said catch pan, said multi-purpose flow control assembly including at least one pair of first and second spill control panels, means for positioning and maintaining each said pair of panels in said first and second positions, each of said first and second panels having a first end rotatably mounted to an upper margin portion of said upstanding sidewall adjacent said top opening and a second opposed free end, whereby in said first position, said panels are canted at an upward angle forming a peaked cover, a portion of one of said free ends overlies the other said free end in each said pair of panels to prevent liquid flow therebetween and in said second position, the free ends of each pair of panels are rotated upwardly and outwardly to an angled position extending outward and upward of said upper margin portion of said upstanding side wall to funnel liquid falling from said shipping container around said access opening to said reservoir area of said catch pan, said containment apparatus in the closed position having a height dimension which is less than or equal to the height of said rails.

2. A chemical spill containment apparatus as defined in claim 1, wherein said railroad shipping container is a railroad box car loaded with drums containing said chemical material and said catch pan has an elongate rectangular configuration and is positioned outwardly adjacent a rail on which said box car rests, said first panel of each said pair of panels having its first end rotatably mounted about a pivot axis extending parallel to said rail and the free end of each said first panel in said second position extending inwardly under said box car and over said rail.

3. A chemical spill containment apparatus as defined in claim 1 wherein said railroad shipping container is a railroad tank car containing said chemical material and said catch pan has an elongate rectangular configuration and is positioned outwardly adjacent a rail on which said tank car rests, said first panel of each said pair of panels having its first end rotatably mounted about a pivot axis extending parallel to said rail and the free end of each said first panel in said second position extending inwardly under said tank car and over said rail.

4. A chemical spill containment apparatus as defined in claim 3, further comprising a central catch basin disposed between the rails having a base and an upstanding basin wall defining a top opening positioned so as to not interfere with the railroad car wheels and positioned so that the free end portions of said first panels overlay said upstanding basin wall and a portion of said top opening.

5. A chemical spill containment apparatus as defined in claim 4, wherein said central catch basin includes at least one retractable, generally convex roofing panel for covering the top opening of said catch basin in a first closed position of use and said roofing panel being slidably movable with respect to said catch basin to a second protracted position to expose at least a portion of said top opening to thereby permit falling materials to enter said catch basin.

6. A chemical spill containment apparatus as defined in claim 5, wherein said at least one generally convex roofing panel has a peaked, inverted V-shaped configuration.

7. A chemical spill containment apparatus as defined in claim 4, including a second said catch pan disposed adjacent a rail opposite said first catch pan.

* * * * *